Oct. 1, 1957
G. DION-BIRO
2,808,080
CONSTANT-PRESSURE SPRAYING APPARATUS
Filed June 18, 1954
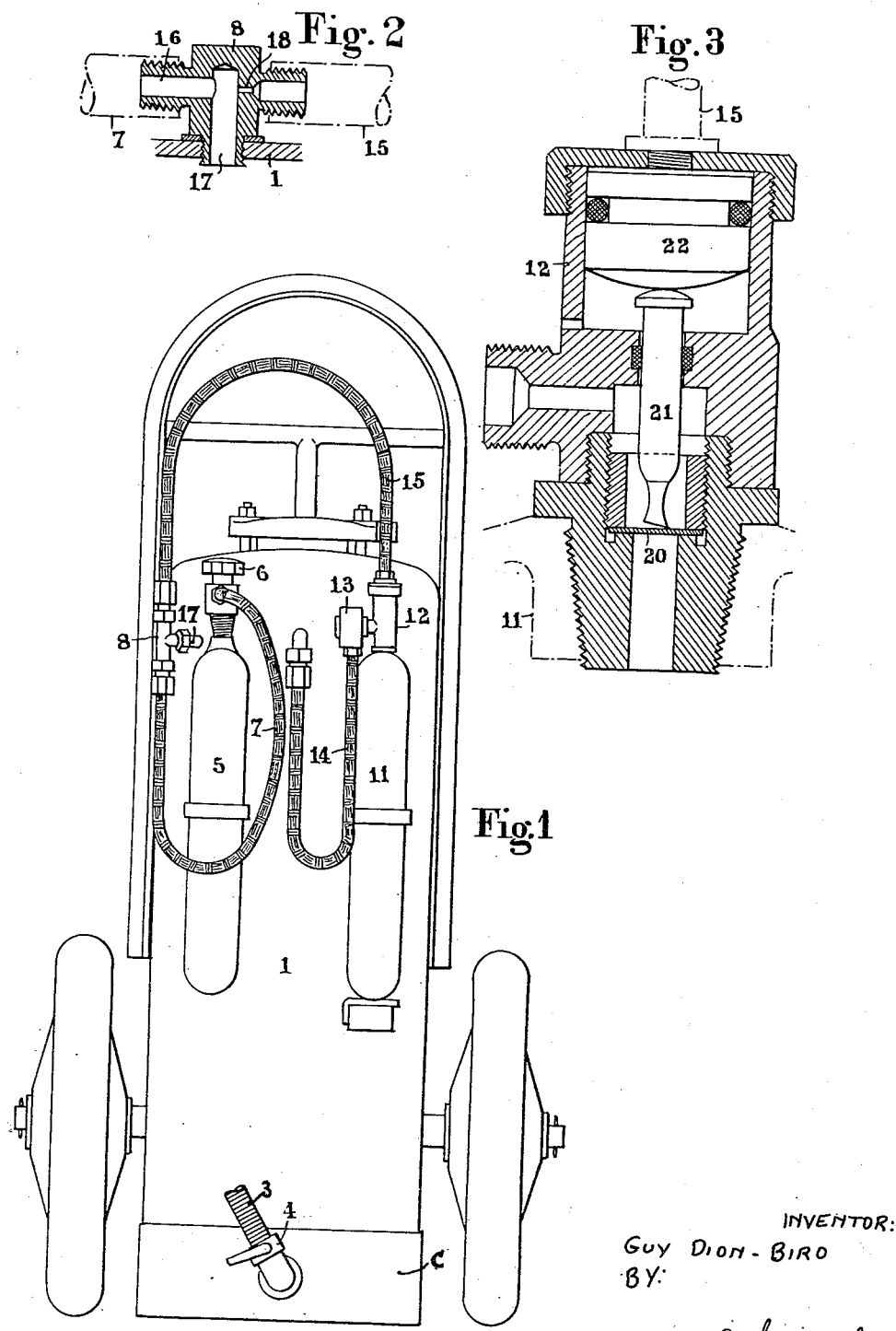
INVENTOR:
Guy Dion-Biro
BY:

United States Patent Office 2,808,080
Patented Oct. 1, 1957

2,808,080

CONSTANT-PRESSURE SPRAYING APPARATUS

Guy Dion-Biro, Boulogne sur Seine, France

Application June 18, 1954, Serial No. 437,715

Claims priority, application France June 23, 1953

6 Claims. (Cl. 141—19)

This invention relates to constant-pressure apparatus for spraying substances such as, for example, insecticides, plant-treating products, wood-treating products, and fire-extinguishing products. Such apparatus generally comprises a reservoir filled with the substance to be sprayed which is ejected from the apparatus at the time of application by means of a pressure gas contained in an auxiliary gas cylinder. The product stored in the main reservoir should be forced out therefrom at an adequate, substantially constant pressure. Carbon dioxide gas is used in apparatus of this type because it liquefies under a relatively low pressure.

In hitherto known apparatus of this general type the gas under pressure was kept in a cylinder which, when the apparatus was about to be used, was connected with the reservoir containing the liquid to be ejected or sprayed. It was generally assumed that the pressure generated in this reservoir by the gas had a convenient value for operating the apparatus. Actually, however, this pressure was initially too high and decreased progressively to values which finally were too low. As a consequence it was not possible to obtain a constant rate of output and range of the sprayed product.

Various attempts have been made to keep this pressure at a constant value, for example, by inserting a pressure-reducing valve between the gas cylinder containing carbon dioxide and the reservoir containing the product to be sprayed. This pressure-reducing valve was adjusted for delivering the gas at a preselected pressure and when the apparatus was about to be used the operator had merely to open the gas cylinder. Thus, the carbon dioxide gas flowed firstly through the pressure-reducing valve, which caused its pressure to drop to the desired constant value, and then into the reservoir containing the product to be sprayed.

However, this arrangement was such that when the valve controlling the carbon dioxide gas cylinder was opened a gas expansion took place on the outlet of the pressure-reducing valve which started at the atmospheric pressure until the preselected operating pressure was attained. As this preselected operating pressure was not reached immediately, an undesirable retarded operation occurred. Moreover, during this starting period a freezing of the pressure-reducing valve took place, due to the fact that the pressure at its delivery orifice was equal to the atmospheric pressure. Such freezing caused the pressure-reducing valve to become inoperative.

To avoid this failure of the pressure-reducing valve some manufacturers have replaced the carbon dioxide gas with nitrogen, but this involves the use of large-size cylinders and increases to a substantial extent the weight and cost price of the apparatus.

It is the object of this invention to provide a novel apparatus for spraying products of the general type disclosed hereinabove, wherein all the aforesaid disadvantages are avoided completely. In the apparatus according to this invention the reservoir containing the product to be ejected is connected on the one hand directly with a first gas cylinder closed by a valve or any other suitable device and adapted to supply a pressure adequate for the operation of the apparatus, and on the other hand through the medium of a pressure-reducing valve with another gas cylinder or set of gas cylinders provided with a common automatic opening device connected in turn with the first gas cylinder and adapted to be actuated by the gas pressure in this gas cylinder after the reservoir containing the product to be sprayed has been brought to the proper or rated pressure value by the first cylinder as soon as the control valve of this first cylinder has been opened.

The cross-sectional area available for the pressure gas released from the first gas cylinder is advantageously greater toward the reservoir than toward the automatic opening device of the other cylinder or set of cylinders, so that the gas from the first cylinder will flow spontaneously into the reservoir containing the product to be sprayed and will subject it to the desired adequate pressure, before the automatic device controlling the other cylinder or set of cylinders is actuated, this automatic device being so adapted that its actuation occurs only when the pressure applied thereto equals the pre-determined or rated value at which the apparatus is to operate.

Thus, when the operator opens the valve controlling the first cylinder, the gas flows spontaneously from this cylinder into the reservoir containing the product and as a result this reservoir is brought instantly to the pressure suitable for operating the apparatus, so that the latter can be used immediately. When the reservoir containing the product to be sprayed has reached its proper pressure, and at that time only, the other cylinder or set of cylinders will be opened and the gas escaping therefrom will flow through the pre-adjusted pressure-reducing valve and will penetrate into the reservoir only when the pressure therein will decrease to the value at which the apparatus is intended to operate.

The spraying apparatus according to this invention operates faultlessly with carbon dioxide gas and is characterized by many advantages over previous art apparatus of corresponding type, operating on carbon dioxide gas. Some of these advantages being that:

(1) The apparatus is constantly ready for immediate use;

(2) The hazard of freezing the pressure-reducing valve is eliminated because when the gas from the other cylinder or set of cylinders is allowed through this valve the pressure at the outlet of the valve is higher than the atmospheric pressure;

(3) A constant pressure is available until the product is ejected completely from the reservoir.

With respect to apparatus operating on nitrogen, the apparatus according to this invention is characterized by many advantages. Some of these advantages being that:

(a) The apparatus is constantly ready for immediate use;

(b) The operating pressure is constant throughout the operation of the appartus;

(c) The over-all dimension and weight of the gas cylinders are reduced to a substantial extent, so that the versatility and handiness of the apparatus are increased accordingly;

(d) The cost of the apparatus is reduced correspondingly.

Other advantages and features of the apparatus according to this invention will become obvious as the following description proceeds with reference to the attached drawings, given by way of example only, wherein:

Fig. 1 is a diagrammatical illustration of one form of embodiment of a spraying apparatus according to the invention, and Figs. 2 and 3 are fragmentary views, partly in section, at different scales, showing details of the apparatus shown in Fig. 1.

Referring to Fig. 1, this embodiment of the invention is shown as comprising a carriage C on which the apparatus is mounted; the latter consists of a reservoir or like container 1 in which the product to be sprayed is stored. This spraying may be effected through a flexible hose 3 controlled by a cock 4 and provided at its outlet end with outlet means, for example, with a nozzle (not shown). A cylinder 5 contains a suitable gas under pressure, for example, carbon dioxide gas, and is closed by a cock 6 the outlet of which is connected through a conduit 7 to the upper portion of the aforesaid reservoir 1 provided in turn with a union T 8. The cylinder 5 has a capacity adequate for ensuring in the reservoir 1 a predetermined pressure adapted to cause the operation of the apparatus.

Another cylinder 11, also filled with carbon dioxide gas under pressure, is connected to the reservoir 1, not directly but through the intermediary of an automatic opening device 12, a pressure-reducing valve 13 and a conduit 14. The automatic opening device 12 is connected through a conduit 15 with the union T 8, as shown in Fig. 2. The automatic opening device 12 is of any known and suitable type. In one embodiment the gas cylinder 1 is closed by a disc 20 adapted to be punctured by a perforating punch 21 actuated by a piston 22 subjected in turn to the control pressure of the gas flowing from the conduit 15, as shown in Fig. 3.

This perforating device is designed to become operative only when the pressure acting thereon equals the total pressure which the first cylinder 5 is adapted to supply, minus 5% as a safety margin. It will be seen that the passages 16 and 17, as shown in Fig. 2, whereby the pressure carbon dioxide gas in the cylinder 5 may flow to the reservoir 1, have a substantially greater cross-sectional area than the orifice 18 through which the pressure gas flows to the automatic device 12 of the other cylinder 11 also containing carbon dioxide gas under pressure.

The operation of the device is as follows:

Assuming the apparatus ready to operate, i. e. with the reservoir 1 filled with the product to be ejected and the cocks 4 and 6 closed, as well, of course, as the automatic device 12 of the other cylinder, the pressure-reducing valve 13 is so adjusted that the gas cannot flow from the other cylinder 11 to the reservoir 1 unless the pressure in this reservoir becomes lower than the pressure required for operating the apparatus.

To use the apparatus it will be sufficient to open the cock 6 of the first cylinder. The carbon dioxide gas compressed therein will flow through the conduit 7 and conduits 16 and 17 of the union T 8 into that portion of the reservoir 1 which overlies the product to be ejected therefrom. Thus, the pressure in reservoir 1 will be brought instantaneously to the desired value and the apparatus will be ready for immediate use.

By so subjecting the reservoir 1 to the aforesaid predetermined pressure, the differential pressure is balanced and the pressure gas, to which only a restricted passage through the orifice 18 had previously been allowed, will now act with its total pressure on the piston 22 so that the latter will be depressed and cause the punch 21 to perforate the disc 20 of the automatic outlet device 12 of the other cylinder 11. Thus, the gas from this other cylinder will flow through the pressure reducing valve 13 but will not be admitted into the reservoir 1 before the pressure therein becomes lower than the required operating pressure. Therefore, the gas delivered by the other cylinder will supply, if necessary, a complemental pressure to the gas already present in the reservoir 1, and it will be seen from the above that the disc 20 acts as a closure member, the punch 21 as an opener member, and the piston 22 as a pressure responsive actuator means, and that the components 20, 21, 22 together cooperate with each other to serve as an operating means for opening the conduit 14 when the pressures within the reservoir 1 and the cylinder 5 are equalized.

In use of the apparatus, the cock 4 is put into its open position in order to enable the product to be ejected through the flexible hose 3. As the level of the product decreases in the reservoir 1, the volume occupied by the compressed gas increases and the pressure-reducing valve 13 will keep the gas pressure to a constant value by allowing into this reservoir 1 compressed gas from the other cylinder 11.

From the foregoing it is apparent that with the arrangement according to this invention an adequate pressure is available immediately in the reservoir 1, as supplied from the first cylinder 5, and that this pressure is maintained at a constant value by the other cylinder 11, until the whole of the product has been ejected from the reservoir, this constituting an optimum operating condition for the apparatus.

Moreover, an additional and extremely important feature of the invention is that in no case can the compressed carbon dioxide gas contained in the other cylinder 11 expand down to the atmospheric pressure value, since it is introduced into the reservoir 1 at the same, or substantially the same, pressure as the rated operating pressure; as a result, no carbonic "snow" will be formed in the pressure-reducing valve 13 and this device will constantly operate in a satisfactory manner.

Of course, the invention is by no means restricted to the specific form or embodiment described and illustrated herein, as this merely constitutes an example given for the purpose of exemplification. Thus, the connection between the first carbon dioxide gas cylinder 5 and the automatic opening device 12 mounted on the other gas cylinder 11 may be effected through any other suitable device than the union T illustrated, provided that the cross-sectional area available for the gas flow toward the reservoir 1 is much greater than that directed toward the conduit 15, so that the automatic opening device 12 will become operative only when the reservoir 1 is filled completely with carbon dioxide gas at the desired rated pressure. The union T connection may be dispensed with and the first cylinder may be connected directly with the reservoir 1. In this case, the conduit 15 supplying the automatic device 12 would be connected to the reservoir 1. The automatic perforating device would communicate through the reservoir 1 with the first cylinder 5 and the latter would supply the necessary pressure to this reservoir before a state of balance sets up and before the pressure causes the perforating device 12 to operate.

The apparatus according to this invention may lend itself satisfactorily to a great variety of applications, such as, for instance, in the treating of plants and crops, in the treating of wood, and in painting processes. This apparatus is also particularly adapted for use as an extremely efficient fire extinguishing device characterized by many features all of which meet the special requirements of modern fire-fighting technique.

What I claim as new is:

1. A liquid delivery supply apparatus, comprising, in combination, a closed container adapted to receive and deliver a liquid under pressure; first and second gaseous medium supply means for supplying gaseous medium under pressure to said container; conduit means for establishing communication between said first gaseous medium supply means and said container whereby gaseous medium is supplied from said first gaseous medium supply means into said container until the pressures within said first gaseous medium supply means and said container are equalized; connecting means for establishing communication between said second gaseous medium supply means and said container means; operating means for activating said connecting means when the pressures within said first gaseous medium supply means and said container are equalized; and pressure reducing value means in said connecting means for preventing the flow of gaseous medium therethrough from said second gaseous medium supply means into said container whenever the gas pressure therein exceeds a predetermined value whereby when the pressure within said container has as a result of discharge of the liquid dropped below said predetermined value said gaseous medium flows through said connecting means from said second gaseous medium supply means into said container thereby maintaining the pressure therewithin substantially at said predetermined value during discharge of the liquid from said container.

2. A liquid delivery supply apparatus, comprising, in combination, a closed container adapted to receive and deliver a liquid under pressure; first and second gaseous medium supply means for supplying gaseous medium under pressure to said container; first conduit means for establishing communication between said first gaseous medium supply means and said container whereby gaseous medium is supplied from said first gaseous medium supply means into said container until the pressures within said first gaseous medium supply means and said container are equalized; second conduit means for establishing when open communication between said second gaseous medium supply means and said container means; operating means for opening said second conduit means when the pressures within said first gaseous medium supply means and said container are equalized; and pressure reducing value means in said second conduit means for preventing the flow of gaseous medium therethrough from said second gaseous medium supply means into said container whenever the gas pressure therein exceeds a predetermined value whereby when the pressure within said container has as a result of discharge of the liquid dropped below said predetermined value said gaseous medium flows through said second conduit means from said second gaseous medium supply means into said container thereby maintaining the pressure therewithin substantially at said predetermined value during discharge of the liquid from said container.

3. A liquid delivery supply apparatus, comprising, in combination, a closed container adapted to receive and deliver a liquid under pressure; first and second gaseous medium supply means for supplying gaseous medium under pressure to said container; first conduit means for establishing communication between said first gaseous medium supply means and said container whereby gaseous medium is supplied from said first gaseous medium supply means into said container until the pressure within said first gaseous medium supply means and said container are equalized; second conduit means for establishing when open communication between said second gaseous medium supply means and said container means; operating means in communication with said first conduit means for opening said second conduit means when the pressures within said first gaseous medium supply means and said container are equalized; and pressure reducing value means in said second conduit means for preventing the flow of gaseous medium therethrough from said second gaseous medium supply means into said container whenever the gas pressure therein exceeds a predetermined value whereby when the pressure within said container has as a result of discharge of the liquid dropped below said predetermined value said gaseous medium flows through said second conduit means from said second gaseous medium supply means into said container thereby maintaining the pressure therewithin substantially at said predetermined value during discharge of the liquid from said container.

4. A liquid delivery supply apparatus, comprising, in combination, a closed container adapted to receive and deliver a liquid under pressure; first and second gaseous medium supply means for supplying gaseous medium under pressure to said container; first conduit means for establishing communication between said first gaseous medium supply means and said container whereby gaseous medium is supplied from said first gaseous medium supply means into said container until the pressures within said first gaseous medium supply means and said container are equalized; second conduit means for establishing when open communication between said second gaseous medium supply means and said container means; operating means for opening said second conduit means when the pressures within said first gaseous medium supply means and said container are equalized, said operating means including a closure member closing said second conduit means, an opener member movable relative to said closure member for opening the same, and pressure responsive actuator means for moving said opener member relative to said closure member in such a manner as to open the same; and pressure reducing value means in said second conduit means for preventing the flow of gaseous medium therethrough from said second gaseous medium supply means into said container whenever the gas pressure therein exceeds a predetermined value whereby when the pressure within said container has as a result of discharge of the liquid dropped below said predetermined value said gaseous medium flows through said second conduit means from said second gaseous medium supply means into said container thereby maintaining the pressure therewithin substantially at said predetermined value during discharge of the liquid from said container.

5. A liquid delivery supply apparatus as defined in claim 4, said pressure responsive actuator means including a cylinder, a piston member slidably arranged therein and adapted upon movement in a predetermined direction to move said opener member relative to said closure member in such a manner as to open the same, and third conduit means in communication at one end thereof with said cylinder in such a manner that an increase in pressure in said third conduit means causes movement of said piston member in said direction, the other end of said third conduit means being in communication with said first conduit means in such a manner that the gaseous medium flowing from said first gaseous medium supply means through said first conduit means into said container before the equalization of the pressures within said first gaseous medium supply means and said container substantially bypasses said other end of said third conduit means so that the gaseous medium filling said first gaseous medium supply means, said first conduit means and said container exerts a sufficient pressure upon said piston member to cause the same to move in said direction to move said opener member sufficiently relative to said closure member so that said opener member opens said closure member only after cessation of flow from said first gaseous medium supply means to said container and upon attainment of equalization of pressures within said first gaseous medium supply means and said container.

6. A liquid delivery supply apparatus as defined in claim 4, said pressure responsive actuator means including a cylinder, a piston member slidably arranged therein and adapted upon movement in a predetermined direction to move said opener member relative to said closure member in such a manner as to open the same, and third conduit means in communication at one end thereof with said cylinder in such a manner that an increase in pressure in said third conduit means causes movement of said piston member in said direction, the other end of said third conduit means being in communication with said first conduit means and having a cross-sectional area substantially smaller than the cross-sectional area of said first conduit means so that the gaseous medium flowing from said first gaseous medium supply means through said first conduit means into said container before the equalization of the pressures within said first gaseous medium supply means and said container substantially bypasses said other end of said third conduit means so that the gaseous medium filling said first gaseous medium supply means, said first conduit means and said container exerts a sufficient pressure upon said piston member to cause the same to move in said direction to move said opener member sufficiently relative to said closure member so that said opener member opens said closure member only after cessation of flow from first gaseous medium supply means to said container and upon attainment of equalization of pressures within said first gaseous medium supply means and said container.

References Cited in the file of this patent

UNITED STATES PATENTS

| | | |
|---|---|---|
| 1,969,869 | Allen et al. | Aug. 14, 1934 |
| 2,072,577 | Allen | Mar. 2, 1937 |
| 2,073,688 | Freygang | Mar. 16, 1937 |
| 2,402,826 | Lubbock | June 25, 1946 |